US009672518B2

(12) United States Patent
Sobel et al.

(10) Patent No.: US 9,672,518 B2
(45) Date of Patent: Jun. 6, 2017

(54) SYSTEMS, METHODS, AND DEVICES FOR IMPROVED TRANSACTIONS AT A POINT OF SALE

(71) Applicant: Whirl, Inc., East Palo Alto, CA (US)

(72) Inventors: Kenneth Sobel, East Palo Alto, CA (US); Stephen Sobel, East Palo Alto, CA (US); Jay Cady, East Palo Alto, CA (US)

(73) Assignee: Whirl, Inc., East Palo Alto, CA (US)

( * ) Notice: Subject to any disclaimer, the term of this patent is extended or adjusted under 35 U.S.C. 154(b) by 466 days.

(21) Appl. No.: 14/492,997

(22) Filed: Sep. 22, 2014

(65) Prior Publication Data

US 2015/0088755 A1    Mar. 26, 2015

Related U.S. Application Data

(60) Provisional application No. 61/880,881, filed on Sep. 21, 2013.

(51) Int. Cl.
| | |
|---|---|
| *G06Q 20/00* | (2012.01) |
| *G06Q 20/40* | (2012.01) |
| *G06Q 20/38* | (2012.01) |
| *G06Q 20/20* | (2012.01) |
| *G06Q 20/32* | (2012.01) |

(52) U.S. Cl.
CPC ....... *G06Q 20/40145* (2013.01); *G06Q 20/20* (2013.01); *G06Q 20/327* (2013.01); *G06Q 20/3823* (2013.01); *G06Q 20/3829* (2013.01)

(58) Field of Classification Search
USPC .......................................................... 705/71
See application file for complete search history.

(56) References Cited

U.S. PATENT DOCUMENTS

| | | | | |
|---|---|---|---|---|
| 6,154,879 | A * | 11/2000 | Pare, Jr. ................ | G01F 19/005 705/26.3 |
| 7,155,411 | B1 * | 12/2006 | Blinn .................... | G06Q 20/02 705/1.1 |
| 8,892,462 | B1 * | 11/2014 | Borovsky ............ | G06Q 20/204 705/17 |
| 2004/0107170 | A1 * | 6/2004 | Labrou .................. | G06Q 20/02 705/64 |
| 2013/0246203 | A1 * | 9/2013 | Laracey ............. | G06Q 30/0253 705/21 |

* cited by examiner

*Primary Examiner* — Zeshan Qayyum
(74) *Attorney, Agent, or Firm* — Adam P. Daniels, Esq.; Polsinelli LLP

(57) ABSTRACT

Techniques for improved Point of Sale (PoS) transactions are disclosed. The techniques include a PoS terminal that receives biometric data from a consumer, determines an encryption key based on the biometric data, and transmits the encryption key to a mobile device associated with the consumer to cause the mobile device to decrypt a consumer key and transmit an indication of a successful decryption. The PoS terminal further receives the indication of the successful decryption from the mobile device, and retrieves consumer account information responsive to receiving the indication of the successful decryption.

17 Claims, 14 Drawing Sheets

SYSTEMS, METHODS, AND DEVICES FOR IMPROVED TRANSACTIONS AT A POINT OF SALE

CROSS-REFERENCE TO RELATED APPLICATIONS

The present application is claiming priority of U.S. Provisional Patent Application Ser. No. 61/880,881, filed on Sep. 21, 2013, the content of which is herein incorporated by reference.

BACKGROUND

1. Field of the Invention

The present disclosure relates to consumer transactions, and more particularly, to improved payment techniques.

2. Description of the Related Art

Increasingly, consumers demand easier, safer, and more informative ways to pay for goods and services at a point of sale. Notwithstanding mobile device (e.g., smartphones, etc.) omnipresence, consumers generally resort to traditional payment methods such as physical currency, electronic payment cards, and the like. However, these traditional payment methods generally require consumers to carry a physical wallet, maintain an inventory of currency, etc. Additionally, such traditional payment methods raise security concerns, which often require underlying banks to reissue new cards, compensate for stolen money, etc. Stolen payment credentials highlight some of the traditional payment drawbacks, which result in losses of billions of dollars per year in the United States alone.

Recent attempts to address shortcomings of traditional payment methods incorporate payment methods from a mobile device (e.g., an electronic wallet application, etc.). Despite the promise of addressing the shortcoming of traditional payment methods, such attempts have been met with limited success. For example, such mobile device payment methods provide little value over traditional payment methods since they do not significantly reduce transaction time—transactions completed with a mobile phone over near-field communication link require about the same amount of time as transactions completed with a magnetic swipe card. Additionally, typical mobile wallet payments generally only require a user entered PIN, which does not adequately prevent theft, unwanted access, etc.

Accordingly, even recent attempts to address the shortcomings of traditional payment methods do not offer consumers meaningful improvements in providing easier, safer, and more informative ways to pay for goods and services.

SUMMARY

Provided herein are techniques for Point of Sale (PoS) transactions, which are employed by various devices including PoS terminals, mobile devices, servers, and the like. Such techniques provide fast, secure, and informative transactions at a point of sale.

In one embodiment of improved PoS transactions according to the present disclosure a consumer initiates a financial transaction by providing a biometric data such as a fingerprint to the PoS terminal. The PoS terminal communicates with the consumer's mobile device (e.g., a mobile phone, etc.) and a cloud server to retrieve consumer account information (e.g., payment options, a virtual wallet, etc.) and display relevant consumer account information (e.g., on a resident display). Preferably, the PoS terminal and mobile device communicate using wireless links (e.g., Bluetooth Low Energy (BTLE), and the like). In this fashion, consumers need not interact or otherwise access mobile devices from their pockets or purses during the PoS transaction. Additionally, the PoS terminal can display specific information corresponding to one or more payment methods including, but not limited to: an amount of available credit, annual percentage rate, a number of days until payment is due for a credit account, an account balance, and reward values for the payment method for the underlying PoS transaction. To complete the transaction, the consumer selects a method of payment from the PoS terminal display, which causes the PoS terminal to initiate payment processes at a remote server (e.g., a cloud server). Payment processing is authorized when the mobile device and cloud server authenticate the biometric data provided by the consumer.

In another embodiment, the PoS terminal scans product identification information corresponding with a product to be purchased by a consumer using a scanner, and displays a currency value associated with the product on a graphical user interface (e.g., a running total, etc.). The PoS terminal also receives biometric data from the consumer (e.g., retina, fingerprint, vein pattern, facial recognition, or other biometric measurement), determines an encryption key based on the biometric data (e.g., run a hash operation on the biometric data, etc.), and transmits the encryption key to a mobile device associated with the consumer to cause the mobile device to decrypt a consumer key (e.g., including a key pair—a private key and a public key) and transmit an indication of a successful decryption. The PoS terminal further receives the indication of the successful decryption from the mobile device (e.g., a payment option password, etc.), retrieve consumer account information such as one or more payment tokens corresponding to methods of payment responsive to receiving the indication of the successful decryption. For example, in certain embodiments, the PoS terminal can retrieve the consumer account information by sending a request to a server and providing the payment option password, which causes the server to remit the consumer account information. The PoS terminal also displays the one or more payment tokens (e.g., corresponding to a method of payment) to the consumer, and can optionally display at least one of an Annual Percentage Rate (APR), an account balance, a payment due date, a reward value, an available credit, and a transaction fee associated with each payment token. The PoS terminal receives a selection of at least one of the payment tokens (e.g., from the consumer mobile device, from interaction with the graphical user interface/touch screen, a keypad input, etc.), and transmits a digital receipt to the mobile device associated with the consumer to cause the mobile device to sign the receipt based on the decrypted consumer key (e.g., using the private key) to yield a signed digital receipt. In order to complete the transaction, the PoS terminal validates the signed digital receipt (e.g., using the public key portion of the consumer key).

In certain other embodiments, the PoS techniques described herein can be employed using, for example, a process (e.g., software such as a mobile application or app), executed by a mobile device associated with a consumer. In such other embodiments, the mobile device (e.g., executes the software) receives biometric data (e.g., fingerprint data, retina data, facial identification data, other biometric identification data, etc.) associated with the consumer. The mobile device also determines an encryption key based on the biometric data (e.g., perform a hash function on the biometric data), and encrypts a consumer key (e.g., a private key portion of a consumer key pair) based on the encryption key. The mobile device further receives additional biometric data (e.g., partially encrypted biometric data) from a Point of Sale (PoS) terminal. Optionally, the mobile device can perform error correction on the partially encrypted biometric data to yield a corrected encryption key. The mobile device also determines an additional encryption key based on the additional biometric data received from the PoS terminal (e.g., perform a hash function on the corrected encryption key), and decrypts the consumer key based on the additional encryption key. Preferably, the mobile device transmits an indication of a successful decryption to the PoS terminal when the mobile device decrypts the consumer key based on the additional encryption key to cause the PoS terminal to complete a payment transaction. In addition, the mobile device receives a receipt of a PoS transaction from the PoS terminal, and signs the receipt to yield a signed receipt. For example, the mobile device can generate and sign the receipt based on the consumer key—preferably, a private key portion of the consumer key. In turn, the PoS terminal, one or more remote servers, and/or the PoS terminal in conjunction with the one or more remote servers, validate the signed receipt based on the consumer key—preferably, a public key portion of the consumer key (e.g., using a digital signature algorithm, etc.).

These and other features of the systems and methods of the subject invention will become more readily apparent to those skilled in the art from the following detailed description of the preferred embodiments taken in conjunction with the drawings.

BRIEF DESCRIPTION OF THE DRAWINGS

So that those skilled in the art to which the subject invention appertains will readily understand how to make and use the devices and methods of the subject invention without undue experimentation, preferred embodiments thereof will be described in detail herein below with reference to certain figures, wherein.

A component or a feature that is common to more than one drawing is indicated with the same reference number in each of the drawings.

DESCRIPTION OF EXAMPLE EMBODIMENTS

As discussed above, traditional Point of Sale (PoS) transactions typically use currency, payment cards (e.g., credit cards, debit cards, etc.) which prove cumbersome, insecure, and uninformative relative to a consumer. Moreover, even new approaches, which use mobile devices, fail to provide meaningful improvement over the conventional traditional PoS transactions and thus, have generally not been accepted.

Accordingly, the PoS transaction techniques disclosed herein provide faster, easier, more informative, and secure PoS transactions. In particular, the PoS transaction techniques disclosed herein can be employed by PoS terminals, mobile devices associated with a consumer, and various other network resources (e.g., servers, etc.).

Figure 1:
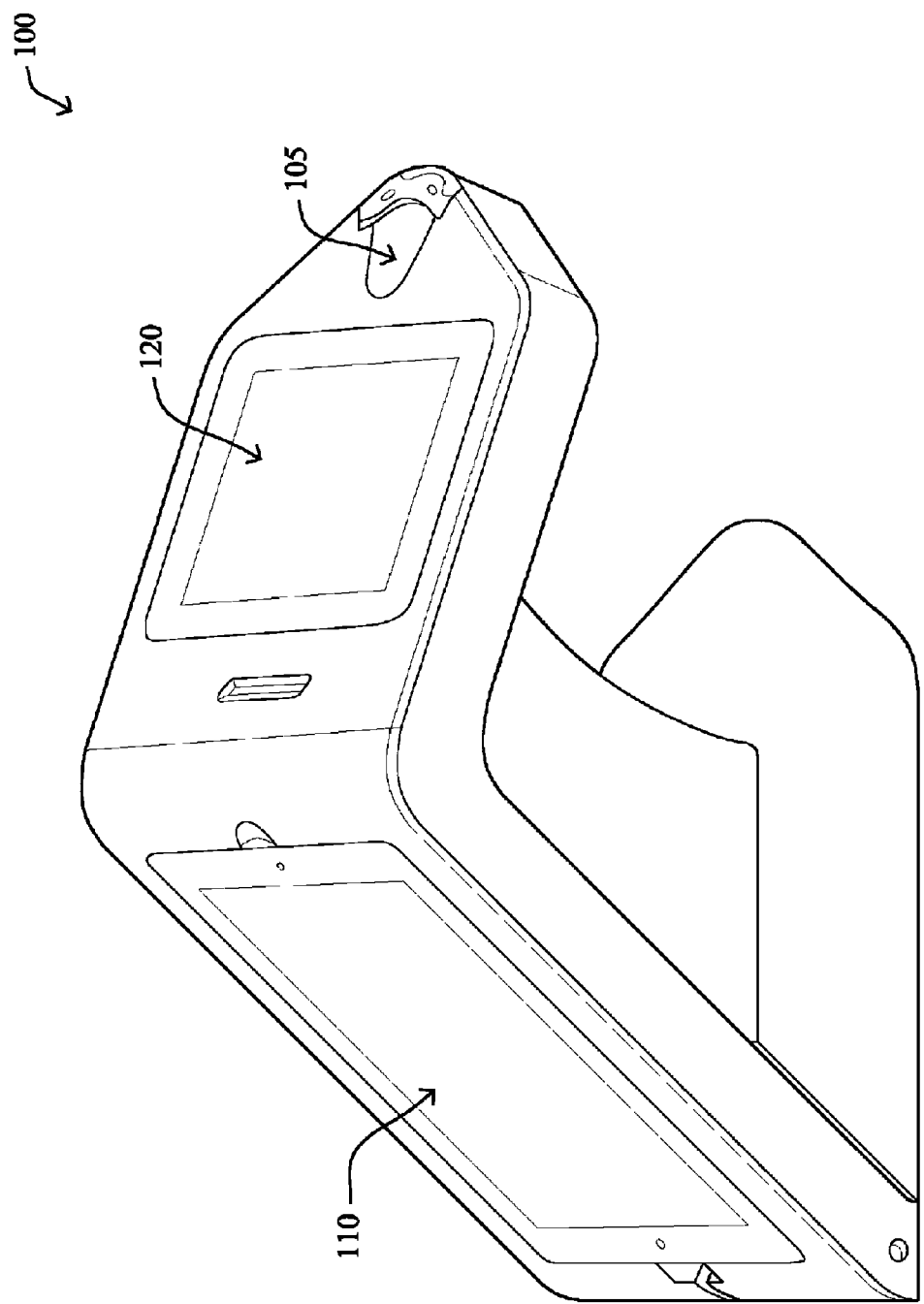
FIG. 1 illustrates a perspective view of a Point of Sale (PoS) terminal 100.

In particular, FIG. 1 illustrates a perspective view of a Point of Sale (PoS) terminal 100. As shown in FIG. 1, PoS terminal 100 includes a biometric sensor 105—here, a fingerprint scanner—an item identifier 110 (e.g., a bar code scanner, cashier input device, etc.), and a display screen 120 (e.g., a touch screen, etc.). Operatively, a cashier or other PoS terminal attendant initiates a PoS transaction or checkout procedure by positioning to-be-purchased items relative to item identifier 110 such that item identifier 110 scans relevant product information from the to-be-purchased item (e.g., a bar code, a Quick Response (QR) code, other product identifiers, etc.). PoS terminal 100 determines, in part, product price information for the corresponding to-be-purchased items based on the relevant information (e.g., product price lookup based on bar codes, etc.) and displays the product price information on display screen 120. Display screen 120 projects outwardly toward a consumer and continuously displays product price information, a running sub-total, etc., during the checkout procedure. Once each item of the PoS transaction is accounted for, the consumer is prompted to select payment options on display screen 120 to complete the PoS transaction. Notably, as discussed in greater detail below, PoS terminal 100 also communicates with additional network modules during a transaction (e.g., a mobile device associated with the consumer, one or more network servers, etc.). Additionally, it is appreciated that the view of PoS terminal 100 shown in FIG. 1 is intended for illustration, not limitation. For example, although the item identifier 110 is shown as a touch-pad, such item identifier can also include scanners, other display screens, manual input devices, and the like. Further, biometric sensor 105 can include additional types of biometric sensors such as a retina scanner, a biometric camera (e.g., to determine facial recognition, vein recognition, etc.), and the like.

Figure 2:
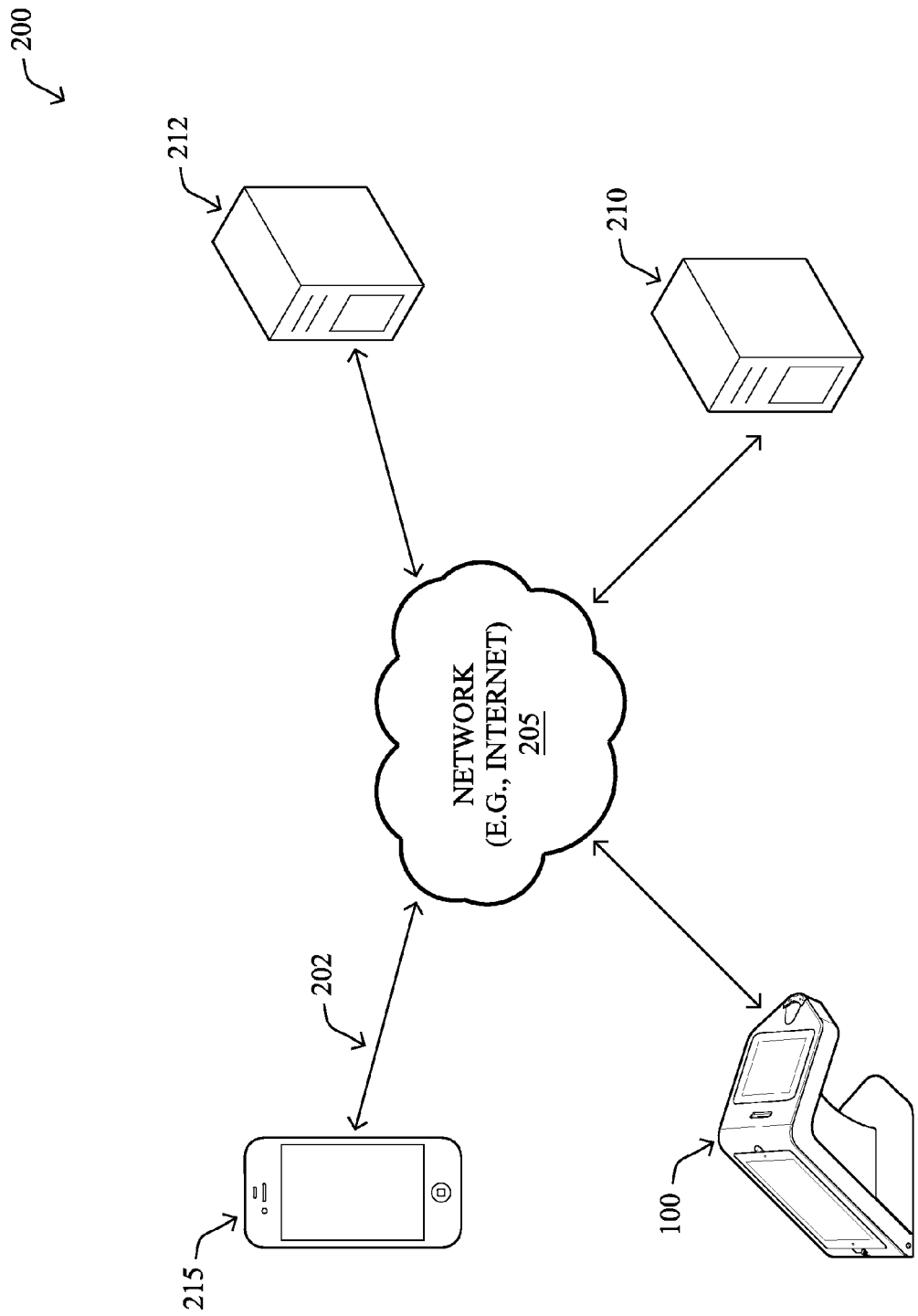
FIG. 2 illustrates a schematic block diagram of an example communication network.

FIG. 2 is a schematic block diagram 200 of an example communication network 205, illustratively showing communication between various devices, including PoS terminal 100, one or more network servers 210 (e.g., a remote or cloud based server, etc.), one or more payment servers 212, and a mobile device 215 (e.g., a mobile computing device such as a cellular phone, a tablet, a laptop, and the like). These devices are interconnected by network 205 using various methods of communication. For instance, communication links 202 may be wired links or may comprise a wireless communication medium. Those skilled in the art will understand that any number of nodes, devices, routers, servers, links, etc. may be used in the communication network, and that the view shown herein is for simplicity. For example, server 210 form part of a larger distributed cloud-based server network and include payment processor server 212. Also, while the embodiments are shown herein with each device communicating by network 205, the devices may communicate directly with other devices (e.g., mobile device 215 can communicate directly with PoS terminal 100).

Figure 3:
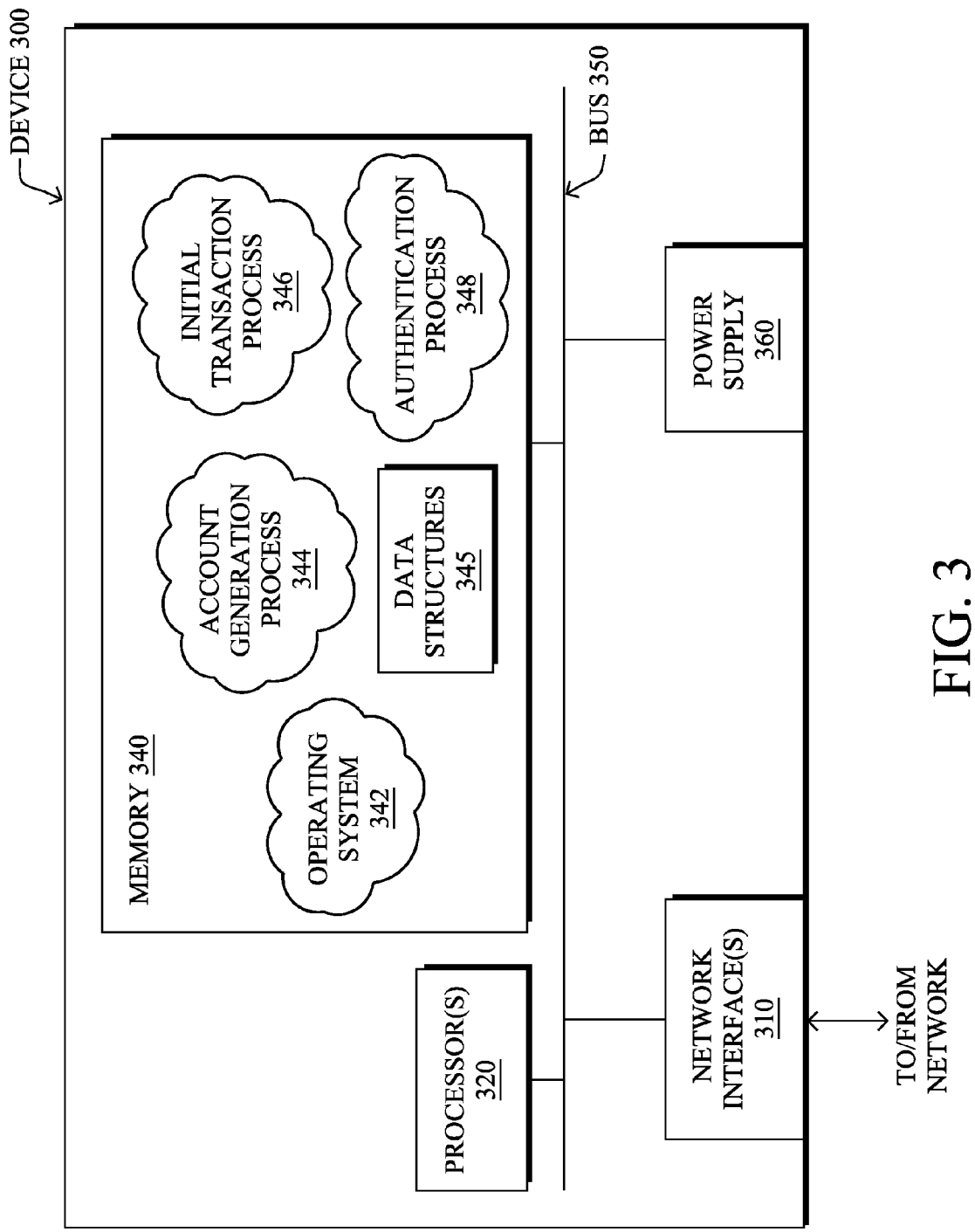
FIG. 3 illustrates a schematic block diagram of an example node/device 300.

FIG. 3 is a schematic block diagram of an example node/device 300 that may be used with one or more embodiments described herein, e.g., mobile device 215, PoS terminal 100, one of servers 210 or 212, etc. The device 300 may comprise one or more network interfaces 310, at least one hardware processor 320, and a memory 340 interconnected by a system bus 350, as well as an optional power supply 360 (e.g., battery, plug-in, etc.).

The network interface(s) 310 contain the mechanical, electrical, and signaling circuitry for communicating data over physical and/or wireless links coupled to the network 205. The network interfaces may be configured to transmit and/or receive data using a variety of different communication protocols, including, inter alia, TCP/IP, UDP, wireless protocols (e.g., IEEE Std. 802.15.4, WiFi, Bluetooth®, etc.), Ethernet, powerline communication (PLC) protocols, etc. Note that certain devices can include two different types of network connections 210. Namely, one or more interfaces may be used to communicate over hardline links, while other interfaces may be used as a WAN uplink network interface between the PoS terminal and one or more remote servers (e.g., consumer account servers 210, bank servers 212, etc.).

The memory 340 comprises a plurality of storage locations that are addressable by the processor 320 and the network interfaces 310 for storing software programs and data structures associated with the embodiments described herein. The processor 320 may comprise necessary elements or logic adapted to execute the software programs and manipulate data structures 345, such as encryption keys (e.g., public keys, private keys, etc.). An operating system 342, portions of which are typically resident in memory 340 and executed by the processor, functionally organizes the device by, inter alia, invoking operations in support of software processes and/or services executing on the device. These software processes and/or services may comprise an account generation process/services 344, an initial transaction process/services 346, and an authentication process/services 348. It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process).

Illustratively, the techniques described herein may be performed by hardware, software, and/or firmware, such as in accordance with the consumer authentication process 344 and/or encryption process 348, which may contain computer executable instructions executed by the processor 320 (or independent processor of interfaces 310) to perform functions relating to the techniques described herein.

Figure 4:
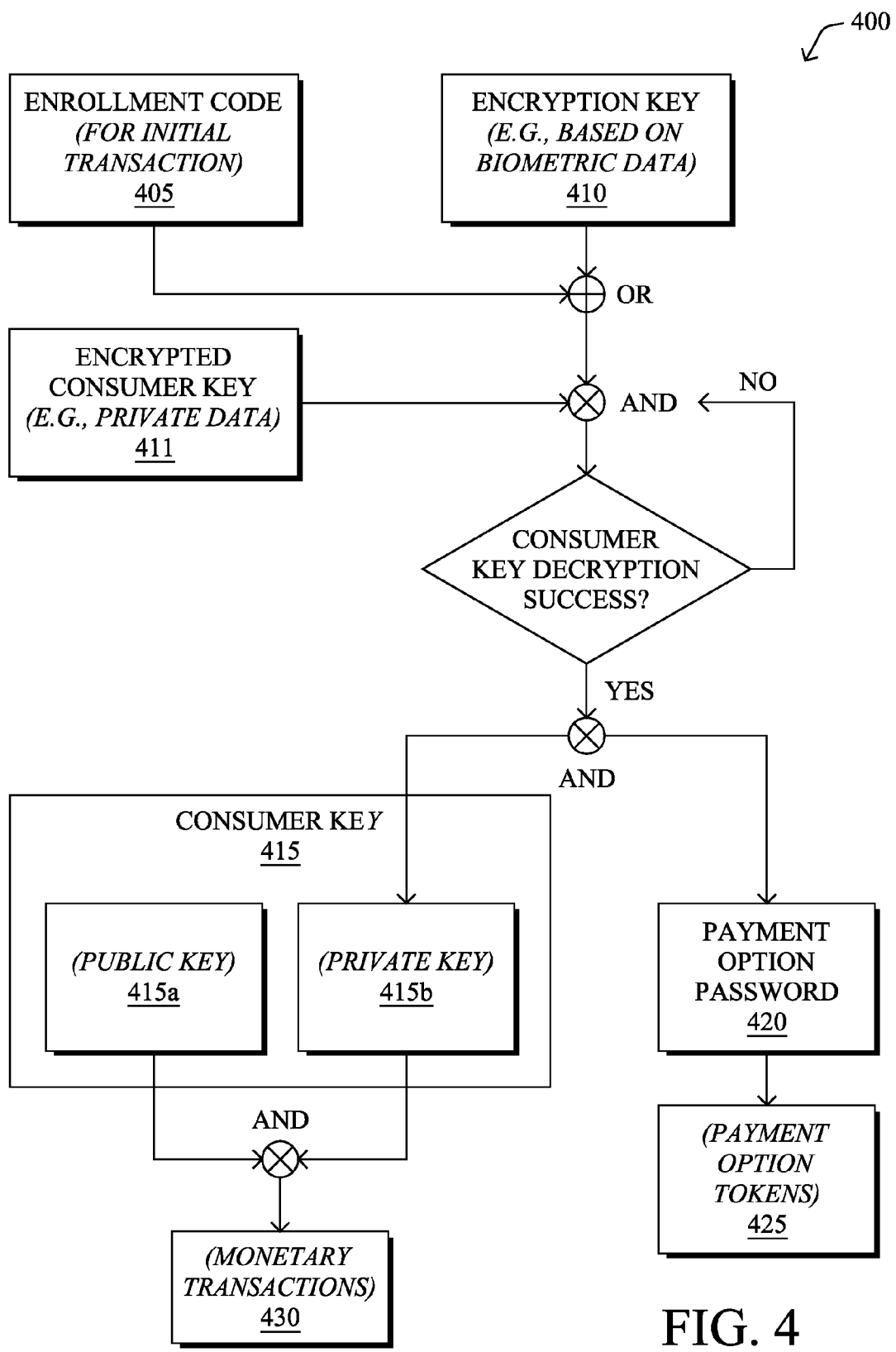
FIG. 4 illustrates a schematic flow diagram, showing operational details for a PoS transaction in a PoS transaction system.

FIG. 4 illustrates the schematic flow diagram 400, showing certain operational details for a PoS transaction in a PoS transaction system. In particular, diagram 400 illustrates various data exchanges, including keys (encrypted and decrypted) between the devices of network 205 (e.g., shown in FIG. 2), which result in a successful PoS transaction (e.g., sale of product(s) or service(s) to a consumer).

As shown, the PoS transaction system begins with mobile device 215 receiving either an enrollment code 405 (e.g., for an initial PoS transaction) or an encryption key 410, which is preferably based on biometric data from a consumer associated with the mobile device. Preferably, the encryption key includes encrypted biometric data such as a fingerprint hash, a retina hash, and the like. Preferably, enrollment code 405 includes a sequence of digits used to initially encrypt a consumer key 415 prior to the first biometric transaction (e.g., at a PoS terminal). However, enrollment code 405 is not limited to a sequence of digits and manifest as any type of data. Furthermore, although the embodiments disclosed herein discuss encrypting the consumer key 415 with the enrollment code 405 prior to a first PoS transaction, such encryption can be optional.

The encryption key 410 generally includes a binary code derived from a consumer's biometric data—here, a fingerprint at a PoS terminal by biometric sensor 105. As discussed in greater detail below, the biometric data is used to encrypt a consumer key (or portion thereof, i.e., a private key), which is used for authentication during PoS transactions subsequent to the initial enrollment transaction. PoS transactions proceed when the mobile device 215 successfully decrypts the encrypted private key 411 based on the biometric data. Although this is the preferred method of controlling access to the consumer key after the first transaction, alternately access to the consumer key can be achieved by, for example, comparing fingerprint (or other biometric) data against a stored fingerprint (or other biometric) template instead of using encryption. Furthermore, this encryption and identification process is not only limited to biometrics data, but can be used with any type of unique identifier that has a binary representation (e.g. RFID, NFC, etc.). Advantageously, the cryptographic structure of encrypting biometric data and using the encrypted biometric data as a key to decrypt a consumer key pair (e.g., a private key and a public key) does not require the fingerprint data to be stored in any long-term memory on any devices. Accordingly, such sensitive biometric data (e.g., very personal identifying data) for each consumer is protected. In turn, this reduces potential risk of third parties stealing or illegally obtaining biometric data for consumers.

Once mobile device 215 receives the enrollment code 405 for an initial PoS transaction or the encryption key 410 for subsequent PoS transactions, it uses the enrollment code 405 or the encryption key 410 to decrypt an encrypted consumer key 411.

After successful decryption, mobile device 215 sends a payment option password 420 to PoS terminal 100, which will use the payment option password 420 to access payment tokens 425, which are representative of payment types for a consumer (e.g., methods of payment from a digital wallet such as credit card, debit card, bank account, etc.). PoS terminal 100 can access such payment tokens from, for example, server 210 and/or from payment server 212. Alternatively, such payment tokens may be accessed by mobile device 215 and sent to PoS terminal 100 after successful decryption. In this fashion, the payment option password 420 controls viewable access to a consumer's payment option tokens since the payment option password 425 is released contingent upon successful decryption of the encrypted consumer key 411. Payment option password 420 is typically matched against a database in server 210 and allows the consumer to view payment option tokens 425. Preferably, payment option password 420 grants only read-access, which prevents completion of the PoS transaction. Completion of the PoS transaction occurs after validation of a signed digital receipt using the consumer key 415, discussed below.

Mobile device 215 also provides the consumer key 415 to PoS terminal as, for example, a signature appended to a digital receipt. As illustrated, consumer key 415 includes a key pair—a public key 415a and a private key 415b. The public key 415a is used to validate the private key 415b, which was used to generate the signature. In this fashion, the consumer key pair 415 protects the execution of monetary transactions. Digital sales receipts are signed based on private key 415b (e.g., a signature is generated based on private key 415b) after the encrypted private key 411 is successfully decrypted, as discussed above. Accordingly, PoS transactions proceed when the server 210 uses the public key to verify that the receipt was signed based on the private key. Preferably, the consumer key pair is an asymmetric pair, symmetric key pairs can also be used.

Figure 5A:
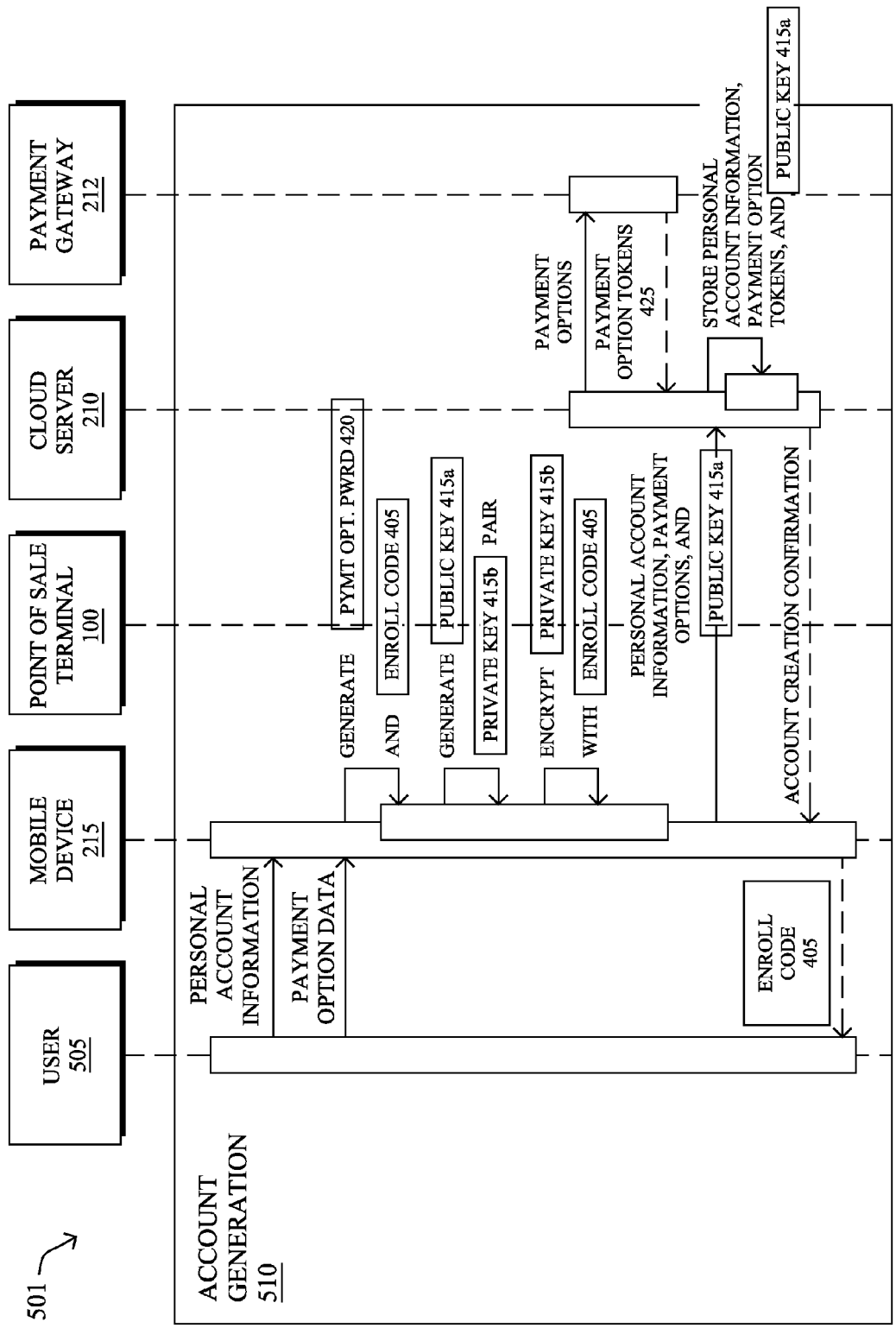
FIG. 5A illustrates a signaling diagram, showing an exchange of data between devices for an account generation process when a user initially enrolls in the PoS system.
Figure 5B:
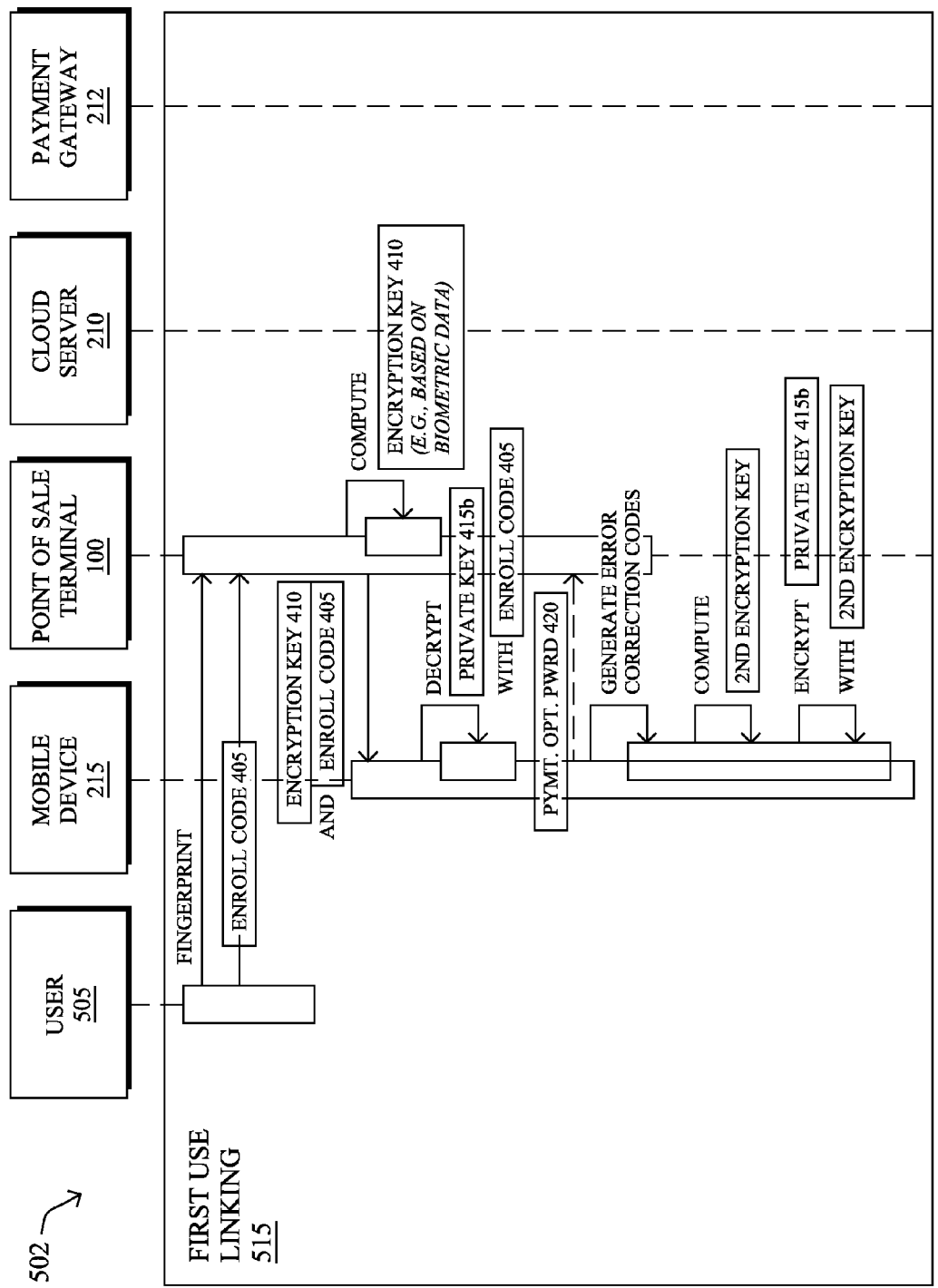
FIG. 5B illustrates a signaling diagram, showing an exchange of data between devices for an initial PoS transaction including a first-use linking process.
Figure 5C:
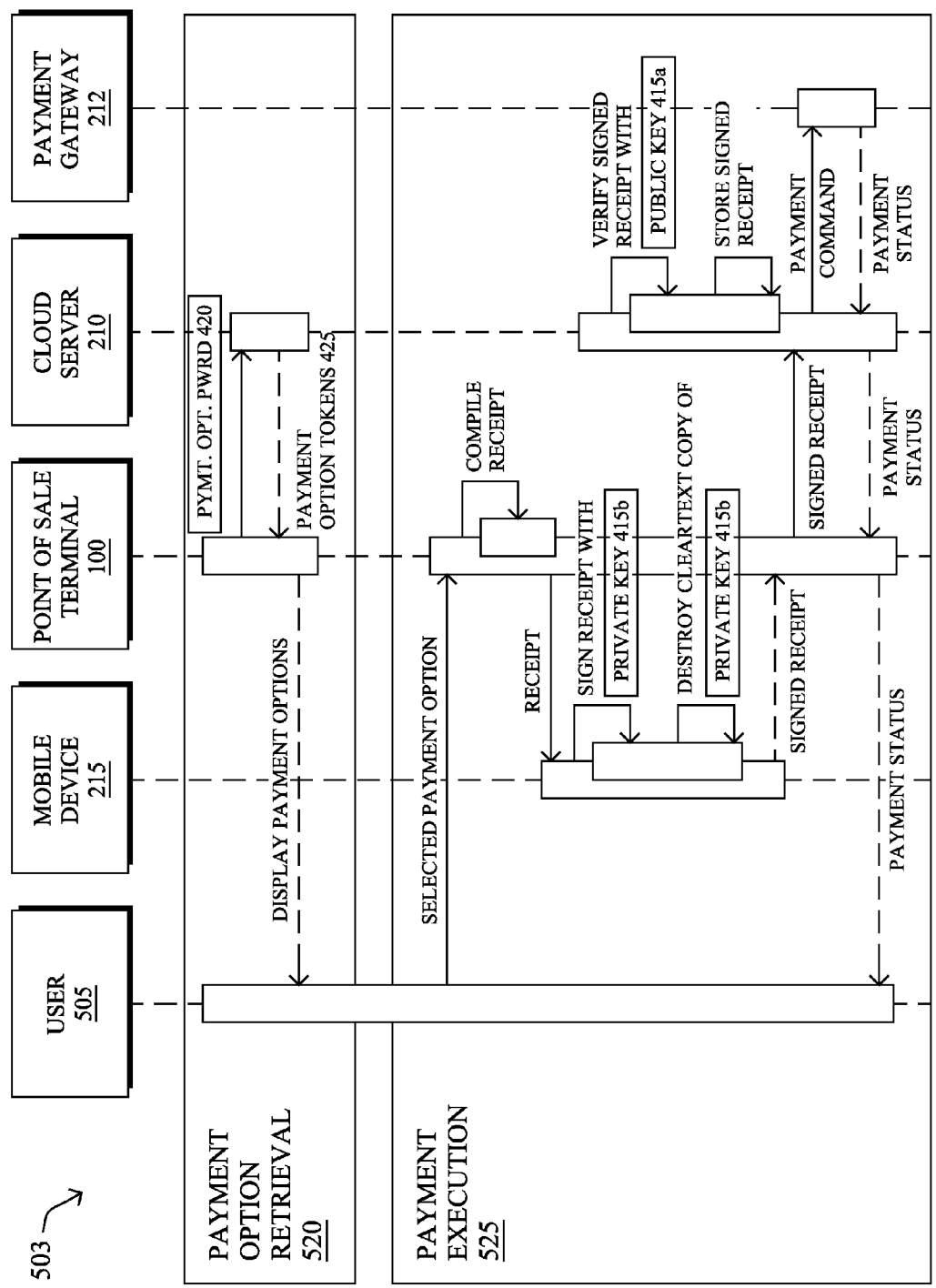
FIG. 5C illustrates a signaling diagram, showing an exchange of data between devices for payment and transaction execution using a payment option retrieval process and a payment execution process.

FIGS. 5A-5C collectively illustrate signal flow diagrams corresponding to account generation shown in diagram 501, first use linking shown in diagram 502, and payment shown in diagram 503 (e.g., including payment option retrieval and payment execution), respectively. Notably, the signal flow diagrams may include one or more of the account generation process/services 344, initial transaction process/services 346, and/or authentication process/services 348, as appropriate.

Diagram 501, illustrated in FIG. 5A, shows an exchange of data between devices for an account generation process 510 when a user 505 enrolls in the PoS system. The data exchange includes, for example, cryptographic keys, hashes, passwords, etc., and the devices, include, for example, mobile device 215, PoS terminal 100, server 210 (e.g., a cloud or remote server), and payment gateway or payment server 212. As shown, in the account generation process 510, enrollment begins when a consumer or user 505 enters personal account information (e.g. username, password, email, demographics, etc.) into mobile device 215. User 505 also enters payment option data (e.g. credit card, debit card, bank account, bitcoin, PayPal, etc.) into mobile device 215. Preferably, mobile device 215 is the preferred method of entry to the PoS transaction system and architecture, but it is readily appreciated that other modes of entry (e.g., accessing a website from any device, etc.) may be used. Additionally, personal and payment information can be entered in any appropriate method (e.g., text input, retrieval from a linked online banking account, scanning cards for image identification, etc.).

Once user 505 provides personal account information and payment option data to mobile device 215, it generates an enrollment code 405 and an option password 418. Both the enrollment code 405 and the payment option password 420 are associated to user 505. Mobile device 215 also generates a consumer key 415, which preferably includes a key pair consisting of a public key 415a and a private key 415b. The private key 415b is encrypted by the enrollment code 405 using, for example, an Advanced Encryption Standard (AES), symmetric key ciphers, and the like. Preferably, mobile device 215 stores the resultant encrypted key for subsequent verification/authentication for an initial PoS terminal transaction.

After the private key 415b is encrypted, mobile device 215 communicates, via network 205, consumer account information, including, for example, payment option data, and also communicates public key 415a to server 210. Server 210 operates as a remote node to provide cloud-based access to consumer account information after verification/authentication of private key 415b using public key 415a. Consumer account information such as payment data can be further communicated, by server 210 to payment gateway/server 212. Payment server 212 generates payment option tokens 425 for corresponding payment data which are then returned to server 210. Server 210 stores the personal account information, payment option tokens 425, and public key 415a in a database. To complete account generation process 510, server 210 returns a confirmation message to mobile device 215. Notably, mobile device 215 also displays the previously generated enrollment code 405 to the user 505, which is used for authentication during the initial PoS transaction.

Diagram 502, illustrated in FIG. 5B, shows an exchange of data between devices for an initial PoS transaction including a first-use linking process 515. As shown in diagram 502, the user 505 supplies biometric data to the PoS terminal 100, here fingerprint data. PoS terminal 100 determines an encryption key 410 (e.g., using a one-way hash, etc.) based on the biometric data. After encrypting the biometric data to yield the encryption key 410, the PoS terminal 100 connects with and transmits the encryption key 410 to mobile devices in close proximity (e.g., using Bluetooth, NFC, any suitable protocol). The proximate mobile devices receive the encryption key 410 and attempt to decrypt resident private keys. However, because not all proximate mobile devices are associated with user 505 and further, because mobile device 215 (associated with user 505) has not completed an initial PoS transaction, decryption using the encryption key fails. PoS terminal 100 fails to receive an indication of successful decryption from proximate mobile devices and recognizes (e.g., after threshold periods of time) that the supplied biometric data corresponds to an initial PoS transaction.

Once the PoS terminal identifies the PoS transaction as an initial PoS transaction, it prompts user 505 to enter the enrollment code 405. User 505 enters enrollment code 405 (previously generated by the mobile device 215) and PoS terminal 100 transmits the enrollment code 405 and the encryption key 410 (e.g., a hash of biometric data) to mobile device 215. Again, as discussed above, using encryption keys based on biometric data—here, encryption key 410—obviates the need to store, long-term, underlying biometric data.

Mobile device 215 re-receives the enrollment code 405 and decrypts the initially encrypted private key 415b using the enrollment code 405. If the decryption is successful, the mobile device 215 transmits a payment option password 420 to PoS terminal 100. PoS terminal 100 uses the option password 420 to retrieve payment tokens from server 210 during a payment process, discussed below.

Mobile device 215 also generates one or more error correction codes that used for an optional error correction process, discussed in greater detail with respect to FIG. 6, below. The error correction process is typically used on encryption key 410 during transactions subsequent to the initial PoS transaction.

Mobile device 215 further applies a second encryption (e.g., a second hash) on the encryption key 410 to yield a second encryption key. It is recognized that the order and sequence of hashing operations on the fingerprint or biometric marker may differ in other embodiments without departing from the scope of this disclosure. After the secondary encryption, the decrypted private key is encrypted with the second encryption key. Notably, a cleartext copy of the private key is kept in short-term memory on the mobile device 215 for use later in the transaction, discussed below.

Diagram 503, illustrated in FIG. 5C, shows an exchange of data between devices for payment and transaction execution using a payment option retrieval process 520 and a payment execution process 525. With respect to the payment option retrieval process 520, the PoS terminal 100 transmits the payment option password 420 (received from the mobile device 215) to server 210. Server 210 retrieves consumer account information, including payment tokens associated with corresponding methods of payment for user 505 and returns such consumer account information to the PoS terminal 100. Preferably, PoS terminal displays (e.g., via display 120) payment tokens to user 505, or alternatively, PoS terminal can transmit the consumer account information to mobile device 215 for display.

During payment execution process 525, user 505 initiates payment execution by selecting a method of payment from the payment tokens displayed by PoS terminal 100 (or selects the payment tokens on mobile device 215). Once selected, PoS terminal 100 compiles a digital receipt, which includes data such as product or item names, product descriptions, prices, discounts, tax, etc., and appends the receipt with the user selected payment option token. The PoS terminal 100 transmits the compiled receipt to the mobile device 215.

Mobile device 215 receives and signs, using a digital signature algorithm, the digital receipt using a cleartext copy of the private key 415b. After signature, mobile device 215 destroys or deletes the cleartext copy of the private key 415b. Mobile device 215 transmits the signed digital receipt to the PoS terminal 100, which (in turn) forwards the signed digital receipt to server 210. Server 210 uses the public key 415a, which is associated with user 505, to verify that the digital receipt was signed by the private key 415b, also associated with user 505. This verification occurs, for example using a Digital Signature Algorithm (DSA), or any other type of digital signature algorithm. Private and public key signature verification is the preferred method to verify that a receipt originated from user 505, however, symmetric key verification methods may also be used. Once server 210 successfully verifies the signature for the digital receipt, the receipt is associated and stored according to user 505.

With respect to the transfer of monetary funds corresponding to the methods of payment, server 210 extracts the payment option token from the digital receipt and sends a payment command to the payment gateway/server 212 using the network 205. Such payment command includes the monetary amount of the charge. The payment gateway/server 212 communicates with other payment processing servers and bank servers as appropriate to approve the transfer of funds. When this communication is complete, the payment gateway 212 returns a status message to server 210 indicating approval or disapproval. The status message is subsequently displayed to the user 205 (e.g., at PoS terminal 100, mobile device 215, in an email sent to user 505, etc.).

Figure 6:
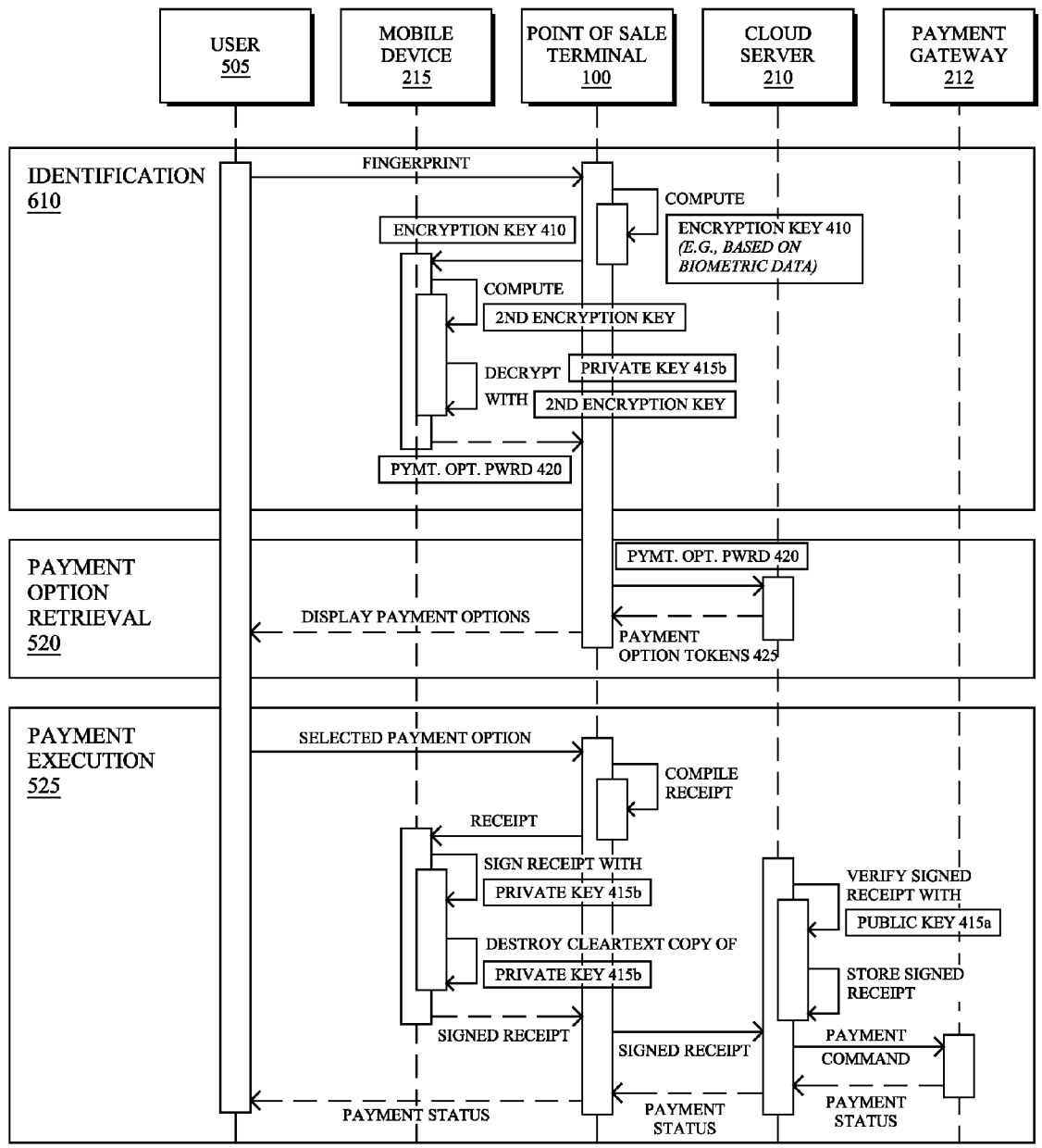
FIG. 6 illustrates a signal flow diagram corresponding to PoS transactions subsequent to the initial PoS transaction.

FIG. 6 illustrates a signal flow diagram 600 corresponding to PoS transactions subsequent to the initial PoS transaction, discussed above, and particularly includes an identification process 610, the payment option retrieval process 520, and the payment execution process 525. As with FIGS. 5A-5C, signal flow diagram 600 may include one or more of the account generation process/services 344, initial transaction process/services 346, and/or authentication process/services 348, as appropriate.

Identification process 610 begins when user 505 presents biometric data to the PoS terminal 100. PoS terminal 100 determines an initial encryption key (e.g., a biometric hash) based on the biometric data and transmits the initial encryption key 410 to mobile device 215. As discussed above, in certain embodiments, this initial encryption key determined by the PoS terminal typically accounts for certain errors in providing biometric data, and is subsequently subjected to error correction and secondary encryption processes (e.g., a secondary hash function) by mobile device 215. Notably, such error correction process facilitates obtaining reliable data. Although such error correction is optional, it accounts for some errors, e.g., when user 505 provides non-optimal or inconsistent biometric data (due to improper finger placement, etc.) to the PoS terminal 100. Put differently, during subsequent PoS transactions, the PoS terminal typically applies a first hash function on the biometric data to yield encryption key 410. However, the first hash function consciously yields an encryption key that allows for certain levels of error. Mobile device 215 receives the encryption key 410 and uses the encryption key 410 (and/or the error corrected encryption key) to decrypt the encrypted private key 415b (which is stored on mobile device 215). Mobile device 215 indicates successful decryption by sending payment option password 420 to the PoS terminal 100. Additional processes—namely, payment option retrieval process 520 and payment execution process 525—function as described above with respect to FIG. 5B.

Figure 7B:
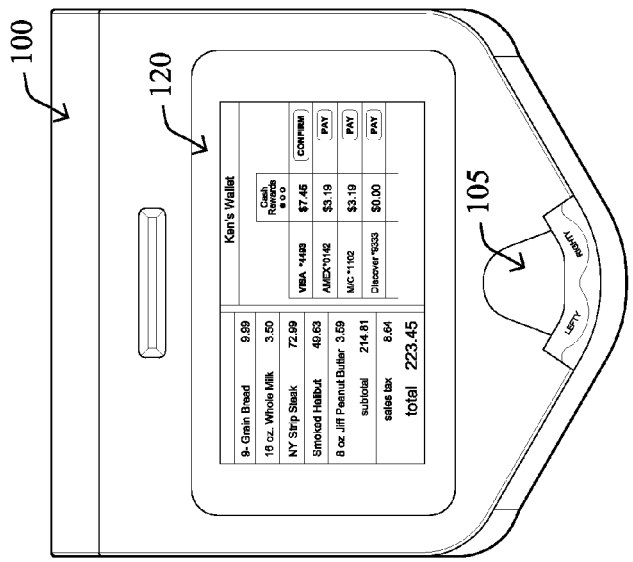
FIG. 7B illustrates a graphical user interface 702, showing payment methods ranked by reward.
Figure 7A:
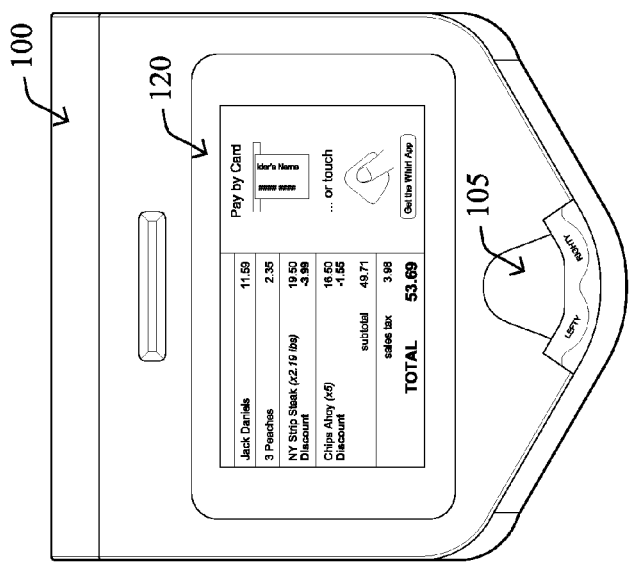
FIG. 7A illustrates a graphical user interface 701, showing item totals presented to a customer.

FIGS. 7A-7D collectively illustrate graphical user interfaces (e.g., display 120 of PoS terminal 100), showing information provided to a customer for a PoS transaction. In particular, FIG. 7A illustrates a graphical user interface 701, showing item totals presented to a customer. As shown, PoS terminal 100 is configured to determine and provide for display a running list of goods and/or services to be purchased for a PoS transaction as they are tabulated by the cashier input device 110. As the cashier adds items to the PoS transaction, the cashier input device 110 passes sale information (i.e. item names, item descriptions, prices, etc.) to the customer display screen 120 in real time. The customer may apply touch gestures to the customer display screen 120 in order to manipulate the view of the list. Additionally, the customer display screen 120 may also prompt the customer regarding various methods of payment, especially various methods of electronic payment like magnetic stripe card, integrated circuit (IC) card, fingerprint, or other biometric marker.

FIG. 7B illustrates a graphical user interface 702, showing payment methods ranked by reward. As shown, PoS terminal 100 is configured to determine and provide for display rank the customer's payment options (e.g., payment tokens corresponding to methods of payment) based on the reward the customer is expected to receive for selecting a certain method of payment. Rewards may manifest as cash rewards, air travel rewards, purchasing points, etc. This information is presented in order to help the customer select the payment method that offers the highest expected return in exchange for the purchase of goods or services at the point of sale.

Figures 7C, 7D:
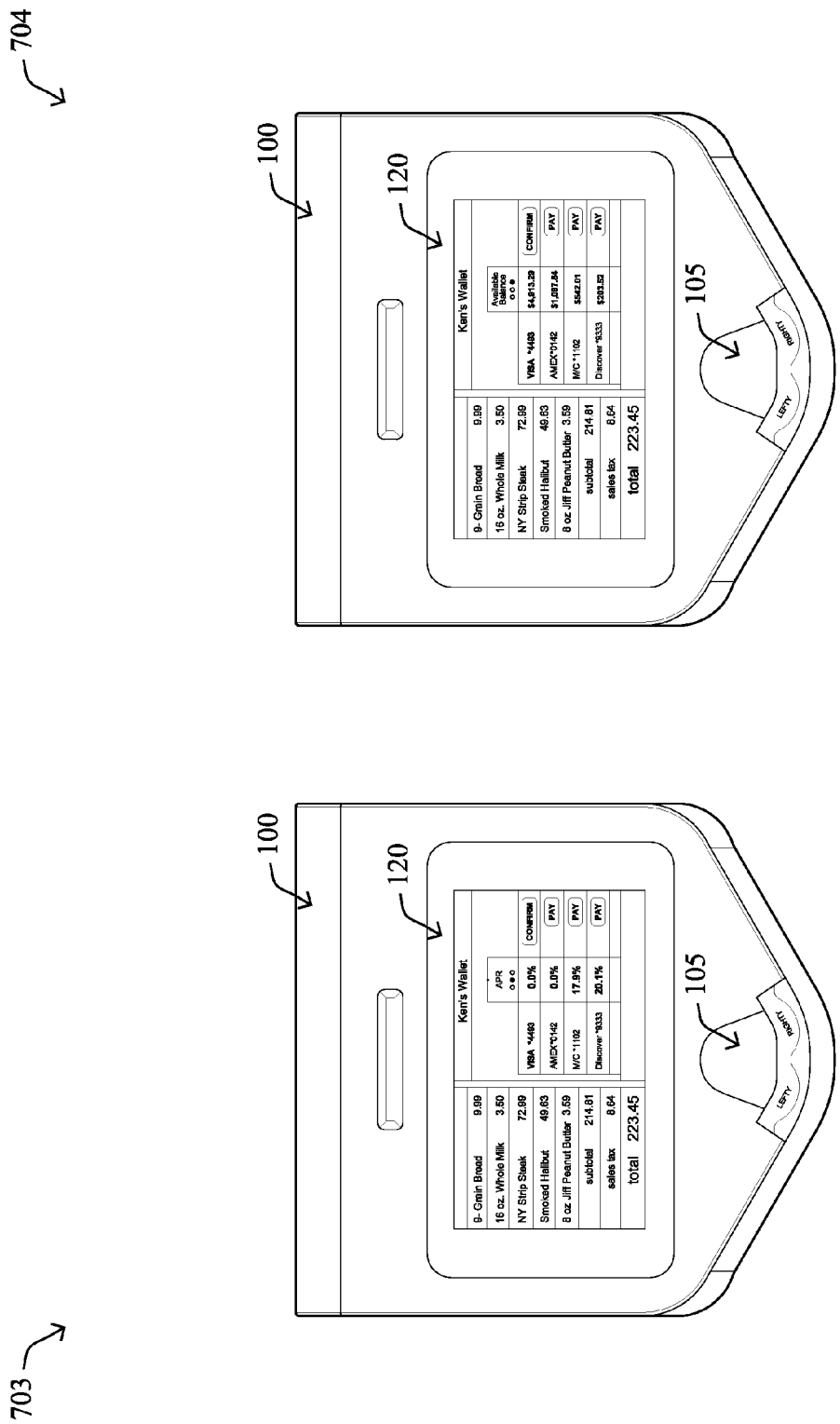
FIG. 7C illustrates a graphical user interface 703, showing payment methods ranked by annual percentage rate (APR)
FIG. 7D illustrates a graphical user interface 704, showing payment methods ranked by available account balance.

FIG. 7C illustrates a graphical user interface 703, showing payment methods ranked by annual percentage rate (APR). As shown, PoS terminal is configured to determine and provide for display a ranking of the customer's payment options based on the annual percentage rate (APR) associated with those payment options, especially if they are linked with credit accounts. This information is presented in order to help the customer select the payment method that has a low cost of credit over time.

FIG. 7D illustrates a graphical user interface 704, showing payment methods ranked by available account balance. As shown, PoS terminal 100 is configured to determine and provide for display a ranking of the customer's payment options based on the available account balance associated with each payment account. This information is presented in order to help the customer select a payment method with sufficient funds at the time of purchase.

Figure 8:
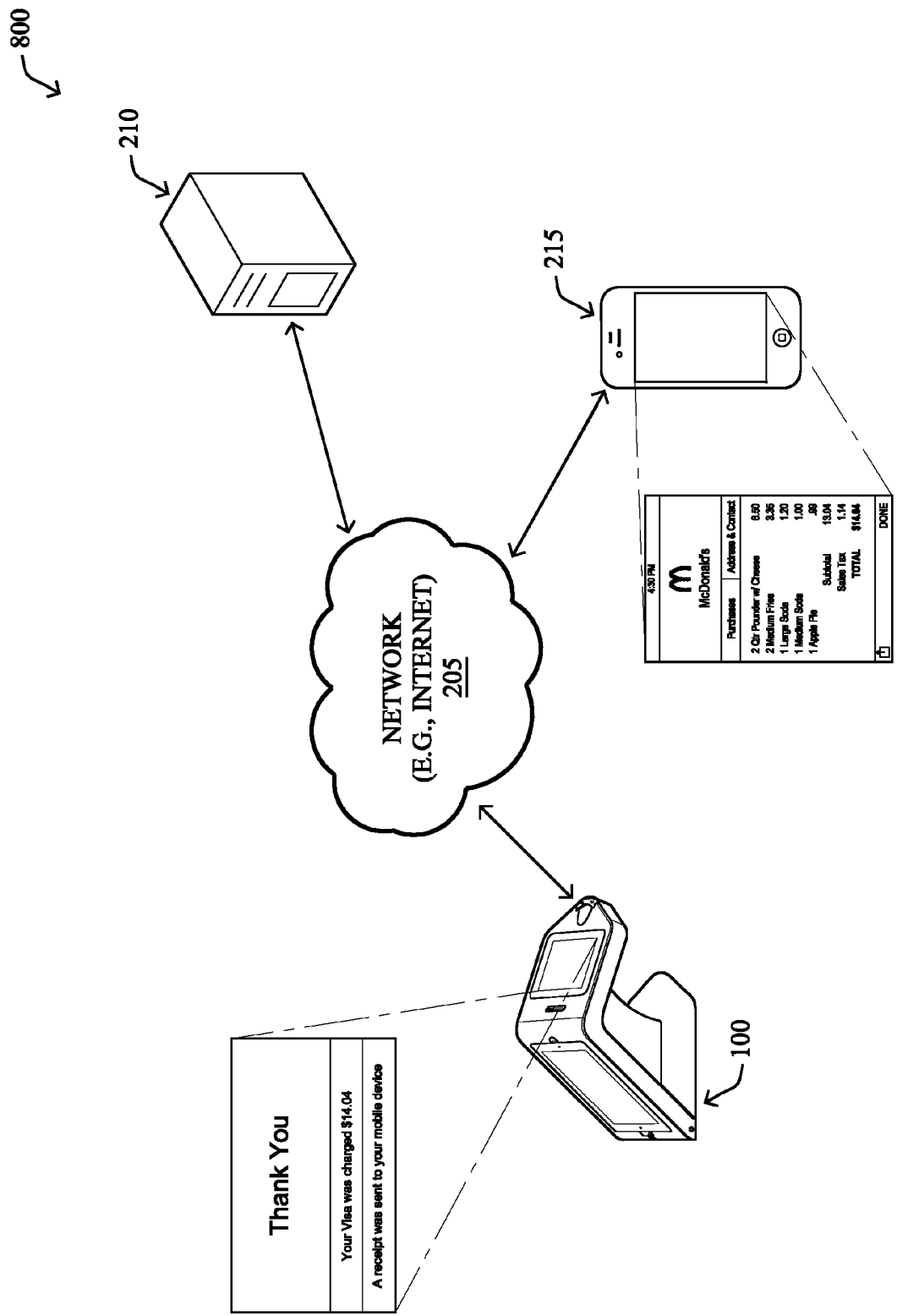
FIG. 8 illustrates a schematic diagram, showing exchange of data between various network devices once a PoS transaction is complete.

FIG. 8 illustrates a schematic diagram 100 showing exchange of data between various network devices once a PoS transaction is complete. In particular, diagram 800 shows the PoS terminal transmitting a digital receipt to the server 210, via the network 205. Mobile device 215 can retrieve the digital receipt from server 210. The digital receipt may contain information such as item names, item descriptions, item prices, discounts, tax, as well as location and contact information for the merchant of whom the goods or services were purchased.

Figure 9:
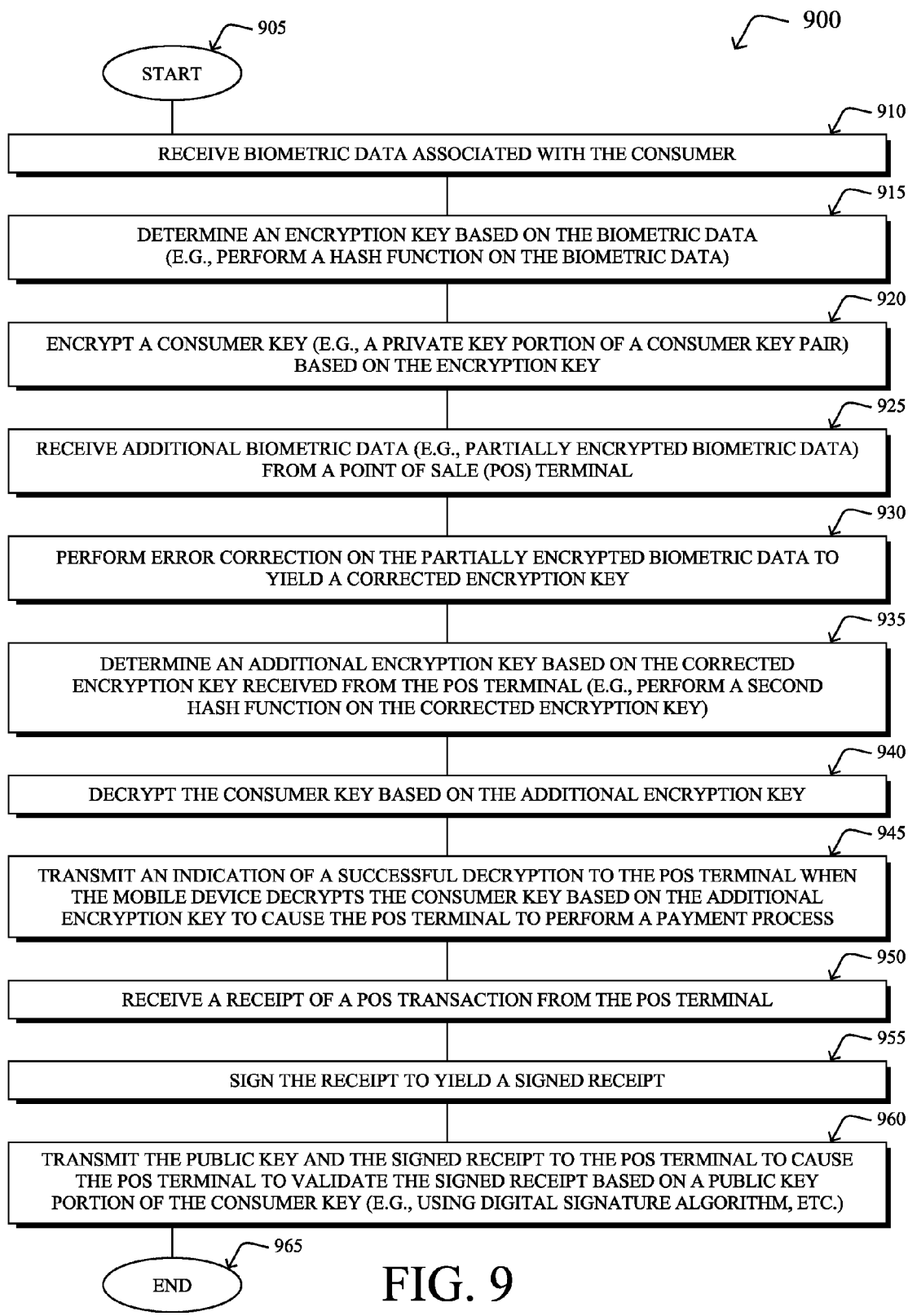
FIG. 9 illustrates an example simplified procedure for improved PoS transactions, particularly from the perspective of a mobile device.

FIG. 9 illustrates an example simplified procedure, i.e., procedure 900, for PoS transactions in accordance with one or more embodiments described herein, particularly from the perspective of the mobile device 215 associated with a consumer or user 505. Procedure 900 starts at step 905, and continues to step 910, where the mobile device begins to setup or initially encrypt a consumer key (e.g., according to the enrollment process discussed above). In particular, in step 910, the mobile device receives biometric data associated with the consumer. Although PoS terminal 100 preferably receives biometric data, mobile device can also receive the biometric data associated with the consumer. Further, mobile device (and/or the PoS terminal) determines an encryption key based on the biometric data in step 915. For example, the mobile device (and/or PoS terminal) can perform a hash function on the biometric data. The mobile device further encrypts a consumer key (e.g., a private key portion of a consumer key pair) based on the encryption key in step 920. Subsequently, post enrollment, the mobile device receives additional biometric data in step 925, during a subsequent PoS transaction. Here, the consumer mobile device receives encrypted biometric data from the PoS terminal. As discussed above, the mobile device can optionally perform error correction on the encrypted biometric data (step 930), which yields a corrected encryption key (or a second encryption key). The mobile device further determines, in step 935, an additional encryption key or a second encryption key based on the corrected encryption key (e.g., perform a second hash function on the corrected encryption key). The mobile device decrypts the consumer key based on the additional encryption key in step 940, and, in step 945, the mobile device transmits an indication of a successful decryption to the PoS terminal. In turn, the PoS terminal performs a payment process. As discussed above, for the payment process, the mobile device receives, in step 950, a digital receipt of a PoS transaction from the PoS terminal and signs the receipt in step 955 to yield a signed receipt. For example, the mobile device can sign the receipt using a private key portion of a consumer key pair, as discussed above. The mobile device further transmits, in step 960, the public key portion of the consumer key pair and the signed receipt to the PoS terminal. The PoS terminal validates the signed receipt based on a public key portion of the consumer key (e.g., using digital signature algorithm, etc.). Notably, the PoS terminal can validate the signed receipt in conjunction with various other servers, discussed in greater detail above. Procedure 900 subsequently ends in step 965, but may continue on to step 910, where the mobile device begins the enrollment process.

Figure 10A:
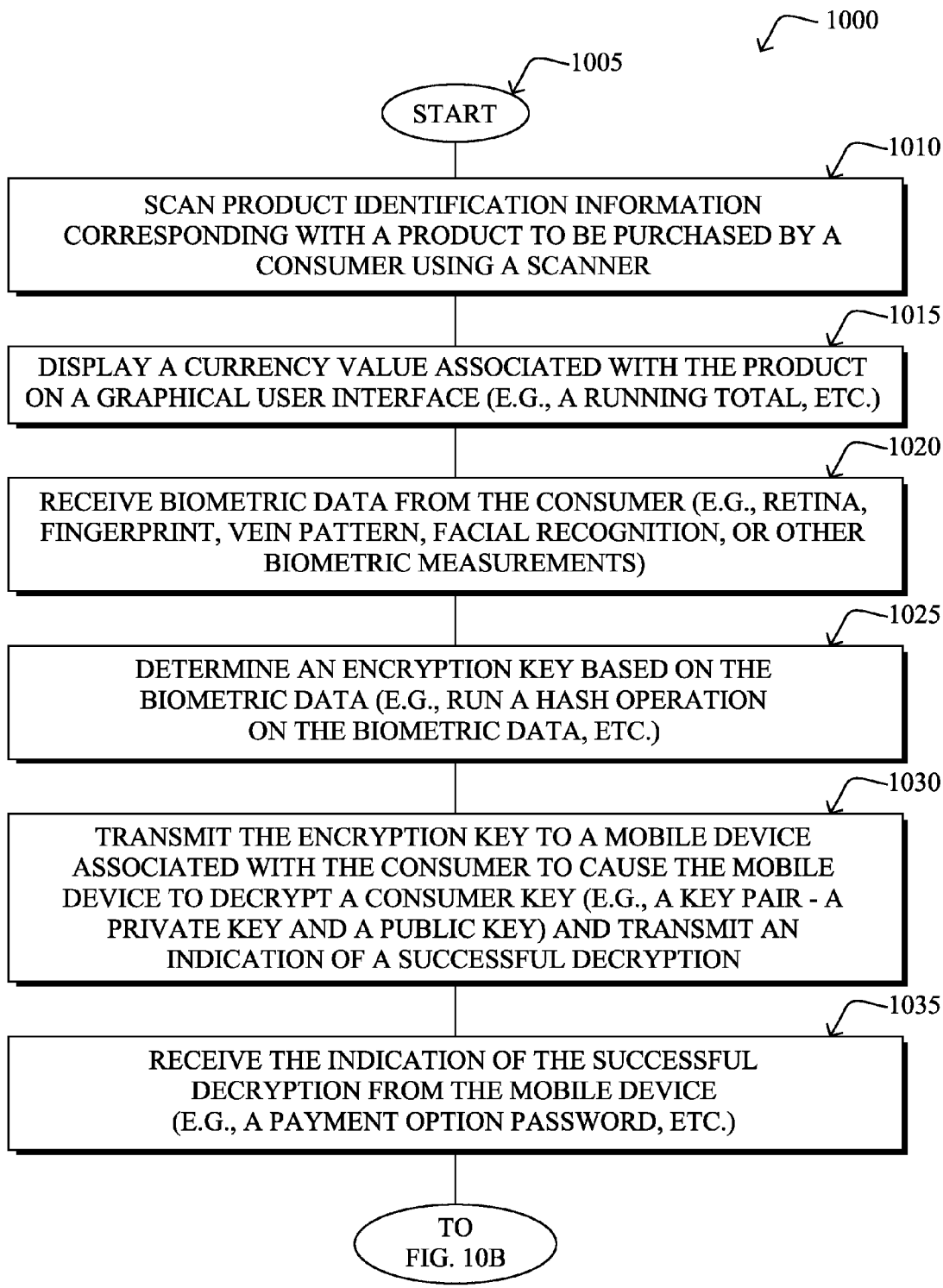
FIGS. 10A-10B illustrate an example simplified procedure for improved PoS transactions, particularly from the perspective of a PoS terminal.
Figure 10B:
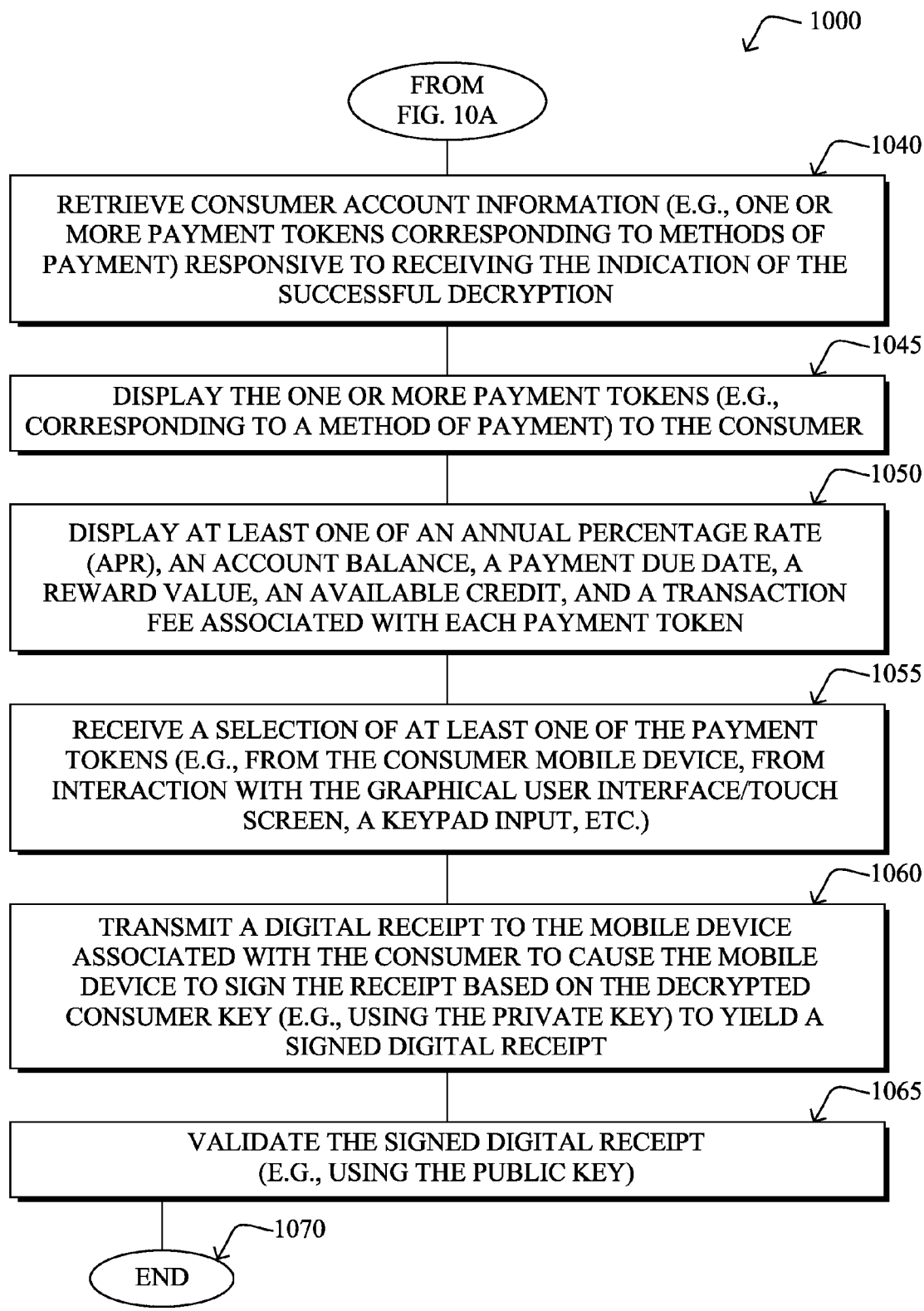

FIGS. 10A-10B illustrate an example simplified procedure, i.e., procedure 1000, for PoS transactions in accordance with one or more embodiments described herein, particularly from the perspective of the PoS terminal 100. Procedure 1000 starts at step 1005, and continues to step 1010, where, as described in greater detail above, the PoS terminal scans product identification information corresponding with a product to be purchased by a consumer using a scanner. The PoS terminal also displays, in step 1015, a currency value associated with the product on a graphical user interface (e.g., a running total, etc.). As discussed above, a consumer provides biometric data (e.g., retina, fingerprint, vein pattern, facial recognition, or other biometric measurements) to a biometric sensor (e.g., biometric sensor 105). The PoS terminal receives, in step 1020, the biometric data from the consumer and determines, in step 1025, an encryption key based on the biometric data. For example, the PoS terminal can execute a hash operation on the biometric data. The PoS terminal further transmits, in step 1030, the encryption key to a mobile device associated with the consumer, which causes the mobile device to decrypt a consumer key (e.g., a key pair—a private key and a public key) and transmit an indication of a successful decryption to the PoS terminal. The PoS terminal receives the indication of successful decryption from the mobile device at step 1035. For example, this indication can be remittance of a payment option password from the mobile device.

Procedure 1000 continues to FIG. 10B, where the PoS terminal retrieves consumer account information at step 1040. For example, the retrieved customer account information, as discussed above, can include one or more payment tokens corresponding to methods of payment. In retrieving the consumer account information, the PoS terminal can send a request to a server (e.g., server 210) and include a payment option password, which causes the server to transmit the relevant consumer account information. The PoS terminal further displays, in step 1045, the one or more payment tokens, which correspond to a method of payment. Additionally, the PoS terminal can display (step 1050) an Annual Percentage Rate (APR), an account balance, a payment due date, a reward value, an available credit, and a transaction fee associated with each payment token. A consumer selects one of the payment tokens (which the PoS terminal receives in step 1055), and the PoS terminal transmits, in step 1060, a digital receipt to the mobile device associated with the consumer to cause the mobile device to sign the receipt based on the decrypted consumer key (e.g., using the private key) to yield a signed digital receipt. The PoS terminal, server 210, additional other servers, and/or combinations of these devices working in conjunction validate the signed digital receipt (e.g., using the public key) in step 1065. Procedure 1000 subsequently ends in step 1070, but may continue on to step 1010 to begin the process for a PoS transaction, as discussed above.

It should be noted that while certain steps within procedures 900-1000 may be optional as described above, the steps shown in FIGS. 9 and 10A-10B are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 900-1000 are described separately, certain steps from each procedure may be incorporated into each other procedure, and the procedures are not meant to be mutually exclusive.

The techniques described herein, therefore, provide for improved PoS transaction techniques. In particular, the techniques herein significantly address the shortcomings of traditional payment methods and offer consumers quick, efficient, informative, and secure means for completing PoS transactions. Moreover, by using the techniques described above, a consumer never needs to open a wallet or bring out a mobile device because the various data exchanges for a PoS transaction uses wireless communication technologies and leverages securely encrypted data.

While there have been shown and described illustrative embodiments that provide for improved PoS transactions, it is to be understood that various other adaptations and modifications may be made within the spirit and scope of the embodiments herein. For example, the embodiments have been shown and described herein with specific reference to processes performed by particular devices—a mobile device, a PoS terminal, and one or more servers (e.g., remote server 210, payment gateway/server 212). However, such description is for purposes of simplicity and not limitation. It is to be understood that various functionality performed by any specific node/device can be performed by other nodes/devices. Additionally, with respect to communication, it is appreciated that various nodes/devices can be in direct communication with each other without deviating from the scope and spirit of this disclosure. Moreover, the embodiments in their broader sense are not limited to particular protocols, but instead, may be used with other types of networks and/or protocols.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method for point-of-sale transactions, comprising:
    receiving, by a Point of Sale (PoS) terminal, biometric data from a consumer;
    determining, by the PoS terminal, an encryption key based on the biometric data;
    transmitting, by the PoS terminal, the encryption key to a mobile device associated with the consumer;
    receiving, by the PoS terminal, a payment option password from the mobile device;
    transmitting, by the PoS terminal, the payment option password to a server;
    receiving, by the PoS terminal, consumer account information from the server; and
    displaying, by the PoS Terminal, the consumer account information.

2. The method of claim 1, further comprising:
    scanning, by the PoS terminal, product identification information corresponding to a product to be purchased; and
    displaying, by the PoS terminal, a currency value associated with the product.

3. The method of claim 1, wherein the consumer account information comprises one or more payment tokens that correspond to methods of payment, the method further comprising:
    displaying, by the PoS terminal, the one or more payment tokens to the consumer;
    receiving, by the PoS terminal, a selection of at least one of the payment tokens;
    transmitting, by the PoS terminal, a digital receipt to the mobile device;
    receiving, by the PoS terminal, a signed digital receipt from the mobile device; and
    validating, by the PoS terminal, the signed digital receipt.

4. The method of claim 3, wherein the mobile device decrypts a consumer key based on the encryption key transmitted by the PoS terminal, wherein the consumer key includes a key pair comprising a private key and a public key, and wherein the mobile device signs the digital receipt based on the private key, the method further comprising:
    receiving, by the PoS terminal, the public key from the mobile device, and
    wherein, validating the signed digital receipt further comprises validating, by the PoS terminal, the signed digital receipt using the public key.

5. The method of claim 1, wherein the PoS terminal determines the encryption key based on the biometric data using a hash algorithm.

6. The method of claim 1, wherein the encryption key determined by the PoS terminal is a first encryption key, and
    wherein, the mobile device performs an error check on the first encryption key to yield a second encryption key, performs a hash function on the second encryption key, and decrypts a consumer key based on the second encryption key.

7. The method of claim 1, wherein the consumer account information includes one or more methods of payment, the method further comprising:
    displaying, by the PoS terminal, one or more payment token corresponding to each method of payment.

8. The method of claim 7, further comprising:
    assigning, by the PoS terminal, a priority to one of the one or more payment tokens based on at least one of an Annual Percentage Rate (APR), an account balance, a payment due date, a reward value, an available credit, or a transaction fee, and
    wherein displaying, by the PoS terminal, the one or more payment tokens comprises displaying the one or more payment tokens according to a respective priority.

9. The method of claim 1, wherein the consumer account information includes at least one of an Annual Percentage Rate (APR) for a method of payment, an account balance, a payment due date, a reward value, an available credit, or a transaction fee associated with each method of payment.

10. The method of claim 1, wherein the biometric data from the consumer includes at least one of a fingerprint, a retina scan, a facial image, or a vein pattern.

11. A Point of Sale (PoS) terminal, comprising:
    one or more network interfaces adapted to communicate with a mobile device associated with a consumer in a communication network;
    a processor adapted to execute instructions; and a memory configured to store the instructions executable by the processor, the instructions, when executed by the processor, cause the processor to perform the operations of:
receiving biometric data from a consumer;
determining an encryption key based on the biometric data;
transmitting the encryption key to a mobile device associated with the consumer;
receiving a payment option password from the mobile device;
transmitting the payment option password to a server;
receiving consumer account information from the server; and
displaying the consumer account information.

12. The PoS terminal of claim 11, further comprising:
a scanner that identifies product information; and
a graphical user interface that displays data to the consumer, and
wherein, the instructions, when executed by the processor, further cause the processor to perform the operations of:
scanning product identification information corresponding to a product to be purchased using the scanner; and
displaying a currency value associated with the product by the graphical user interface.

13. The PoS terminal of claim 11, wherein the consumer account information comprises one or more payment tokens that correspond to methods of payment, and wherein the instructions, when executed by the processor, further cause the processor to perform the operations of:
displaying the one or more payment tokens to the consumer;
receiving a selection of at least one of the payment tokens;
transmitting a digital receipt to the mobile device;
receiving a signed digital receipt from the mobile device; and
validating the signed digital receipt.

14. The PoS terminal of claim 13, wherein the mobile device decrypts a consumer key based on the encryption key transmitted by the PoS terminal, wherein the consumer key includes a key pair comprising a private key and a public key, and wherein the mobile device signs the digital receipt based on the private key, and wherein the instructions, when executed by the processor, further cause the processor to perform the operations of:
receiving the public key from the mobile device, and
wherein, when the processor validates the signed digital receipt, the processor further performs the operations of validating the signed digital receipt using the public key.

15. The PoS terminal of claim 11, wherein the instructions, when executed by the processor, further cause the processor to perform the operations of determining the encryption key based on the biometric data using a hash algorithm.

16. The PoS terminal of claim 11, wherein the consumer account information includes one or more methods of payment, and wherein, the instructions, when executed by the processor, further cause the processor to perform the operations of:
displaying one or more payment tokens corresponding to each method of payment, and
displaying at least one of an Annual Percentage Rate (APR), an account balance, a payment due date, a reward value, an available credit, or a transaction fee associated with one or more of the methods of payment.

17. A tangible, non-transitory, computer-readable media having software instructions encoded thereon, the software instructions, when executed by a processor of a Point of Sale (PoS) terminal, cause the processor to perform the operations of:
receiving biometric data from a consumer;
determining an encryption key based on the biometric data;
transmitting the encryption key to a mobile device associated with the consumer;
receiving a payment option password from the mobile device;
transmitting the payment option password to a server;
receiving consumer account information from the server; and
displaying, on a display of the PoS Terminal, the consumer account information.

* * * * *